US005289955A

United States Patent [19]

Sulenski

[11] Patent Number: 5,289,955

[45] Date of Patent: Mar. 1, 1994

[54] TRI-LEVEL HIGHLIGHT COLOR REPLENISHER

[75] Inventor: Timothy J. Sulenski, Walworth, N.Y.

[73] Assignee: Xerox Corporation, Stamford, Conn.

[21] Appl. No.: 942,547

[22] Filed: Sep. 9, 1992

[51] Int. Cl.[5] .......... G01F 11/20

[52] U.S. Cl. .......... 222/413; 222/333; 222/DIG. 1; 355/260

[58] Field of Search .......... 222/228, 240, 241, 333, 222/412, 413, DIG. 1; 355/245, 260

[56] References Cited

U.S. PATENT DOCUMENTS 4,739,907 4/1988 Gallant .......... 222/DIG. 1 X
4,943,830 7/1990 Sulenski .......... 355/245
5,139,176 8/1992 Reindl et al. .......... 335/260 X

*Primary Examiner*—Andres Kashnikow
*Assistant Examiner*—Joseph A. Kaufman

[57] ABSTRACT

A developer dispensing apparatus includes a coiled spring used as a slinky auger which is rotated through a developer mixture of toner and carrier beads for dispensing developer through a dispensing opening. The spring auger has a driven end attached to a gear shaft in such a manner that the axis of rotation of the auger is fixed relative to the shaft axis. As the spring auger rotates the tendency of the driven end to ride up on the carrier beads is prevented by the a centering yoke which drivingly connects the drive shaft and the slinky auger. The centering yoke fixes the axis of rotation of the auger so as to inhibit the riding up of the slinky auger on the carrier beads disposed on the bottom of the dispenser.

7 Claims, 3 Drawing Sheets

TRI-LEVEL HIGHLIGHT COLOR REPLENISHER

BACKGROUND AND INFORMATION DISCLOSURE STATEMENT

The present invention relates to a developer dispensing apparatus for a developer station in a xerographic printing machine and, more particularly, to an apparatus which utilizes a helical spring as an auger mechanism.

In prior art printing machines, the toner material used to develop a latent image formed on a photoreceptor surface is consumed in a development process and must be periodically replaced within the development system in order to sustain continuous operation of the machine. One technique which has become generally accepted is the use of a separate toner or developer hopper with a dispensing mechanism for adding the toner from the hopper to the developer apparatus on a regular, or as needed, basis.

The 1065 TM machine a product of the Xerox TM corporation uses a helical spring or as it has come to be known a slinky auger as in a toner dispenser or replenisher. One end of the slinky auger in that machine is attached to a motor shaft and is driven thereby. The connection between the motor shaft and auger is effected by inserting the auger attachment leg through a hole in the motor shaft. Thus, the slinky auger is not rigidly attached to the drive shaft nor is its center in any way restrained from moving off center. This method of attachment works well for the movement of toner particles only. An example of such an attachment is depicted in U.S. Pat. No. 4,943,830 granted to Timothy J. Sulenski on Jul. 24, 1990.

In an arrangement for replenishing developer material which comprises not only toner particles but carrier beads, the aforementioned method of attachment of the auger to the drive mechanism is inadequate. With such an arrangement, rotation of the slinky auger tends to cause segregation of the toner and carrier beads. The carrier beads, being the heavier of the two components, settle to the bottom or floor of the dispenser. Thus, a new "apparent" floor is created which causes the individual coils of the slinky auger to ride up on the carrier beads and eventually end up above the desired home position, home position being defined as the position where the auger coils are closely adjacent and parallel to the sump floor. As the build-up of carrier beads continues, the slinky auger attachment leg slides or shifts within the hole of the shaft motor. This causes the slinky auger to be driven off its center of rotation causing the coils to physically interfere with the side walls of the sump. Eventually, the auger jams and locks up into the wall and starts wrapping itself about the auger motor shaft thereby leading to failure of the dispenser either through stalling of the dispenser motor caused by torque variations or through breakage of the auger.

Unwanted movement of the free end of such an auger and a solution therefor is addressed in the '830 patent but the undesired movement of the driven end is not.

BRIEF SUMMARY OF THE INVENTION

The present invention is, therefore, directed to an improved developer dispensing apparatus which utilizes a helical spring auger to dispense toner and carrier beads within a dispenser housing. The invention deals with restricting the unwanted movement of the driven end of the slinky auger.

A centering yoke is provided for the slinky auger of the present invention which restricts the auger attachment shaft from moving off its center position. The purpose of the foregoing is twofold, in that, transport of the replenisher is not interrupted and the torque fluctuations are diminished.

A further aspect of the present invention is the position of the driven end of the auger relative to the window or exit area from the dispenser. In prior art dispensers, the coils of the auger overly at least a portion of the outlet area thereby diminishing the developer dispensing rate.

DESCRIPTION OF THE INVENTION

Figure 3:
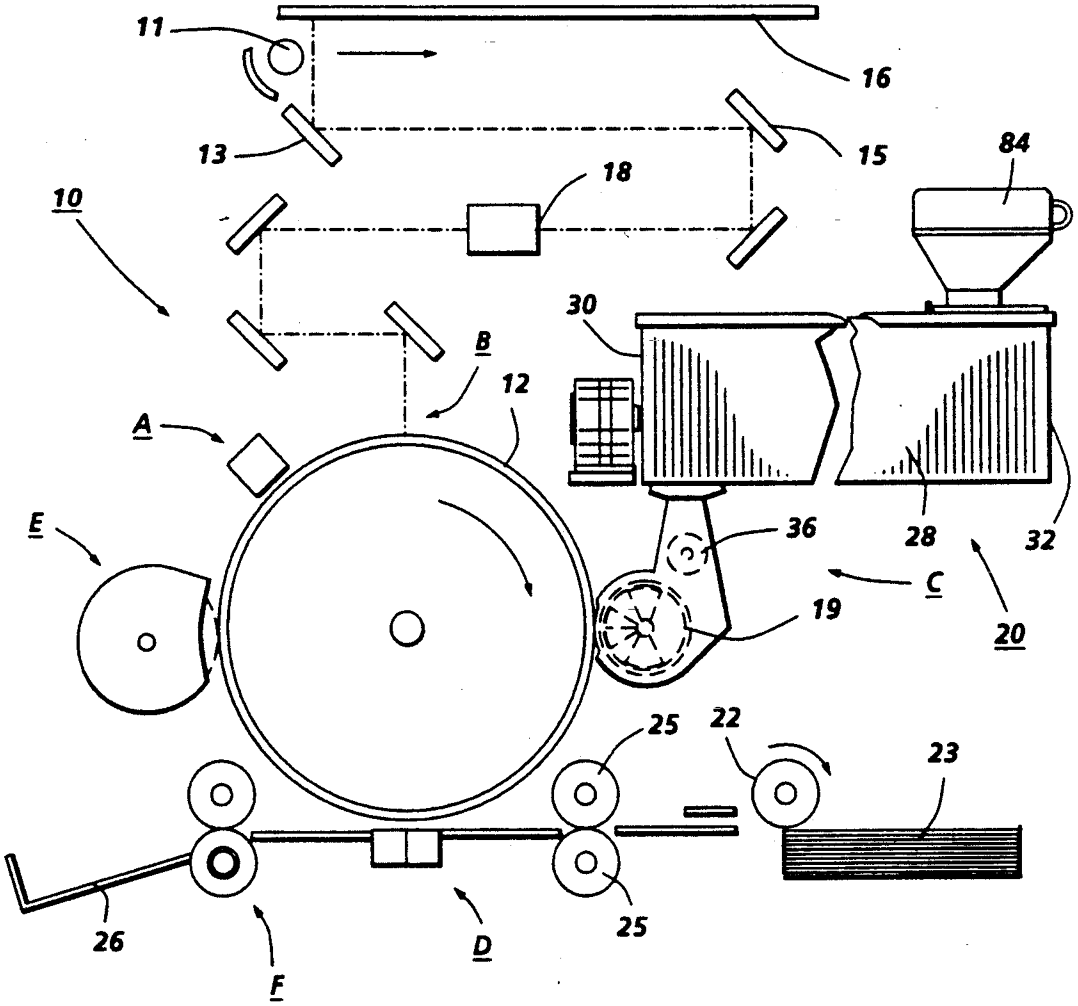
FIG. 3 is a schematic side view representing an automatic printing machine which uses the developer dispensing apparatus illustrated in FIG. 1 according to the present invention.

Referring now to FIG. 3, there is shown an automatic xerographic printing machine 10 including a developer assembly which has a developer storage and dispensing cartridge, according to the present invention. As used herein the term developer is intended to define a variety of mixtures of toner and carrier. The printer includes a photosensitive drum 12 which is rotated in the direction indicated by the arrow to pass sequentially through a series of xerographic processing stations including a charging station A, an imaging station B, a developer station C, a transfer station D, cleaning station E and fusing station F.

A document to be reproduced is placed on platen 16 and scanned by moving an optical system including a lamp 11 and mirrors 13 and 15. The reflected image is projected through stationary lens 18 to produce a flowing light image on the drum surface which has been charged at charging station A. The image is then developed at development station C to form a visible toner image. The development station C includes a developer roll 19 which may, for example, provide a magnetic brush of developer to the drum 12. Roll 19 is supplied with developer from the developer and dispensing apparatus 20. Copy sheet 23 is fed from a supply of cut sheets by feed roll 22 to registration rolls 25, in synchronous relationship with movement of the image on the drum surface. Following transfer of the toner image to the copy sheet, the copy sheet is stripped from the drum surface and directed to the fusing station F to fuse the toner image on the copy sheet after which the drum surface advances to cleaning station E where residual toner remaining on the drum surface is removed prior to the drum surface again being charged at charging station A. Upon leaving the fuser, the copy sheet with the fixed toner image thereon is transported to sheet collecting tray 26. While a copying apparatus has been disclosed in connection with FIG. 3 it will be appreciated that the present invention is useful in printing devices of various types as well as other copying devices not discussed.

Figure 1:
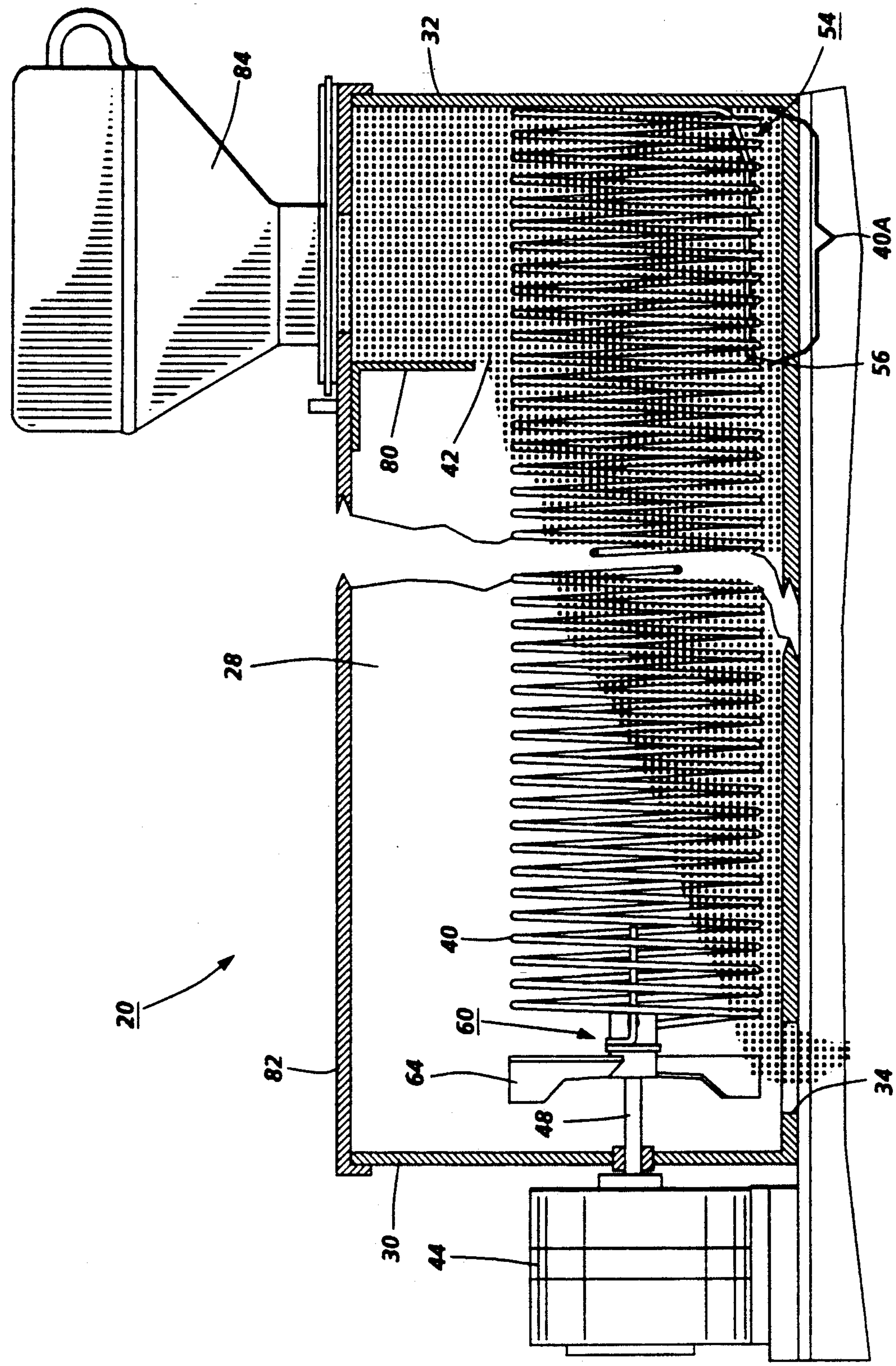
FIG. 1 is a schematic cross-sectional view of a developer dispensing apparatus of the present invention.
Figure 2:
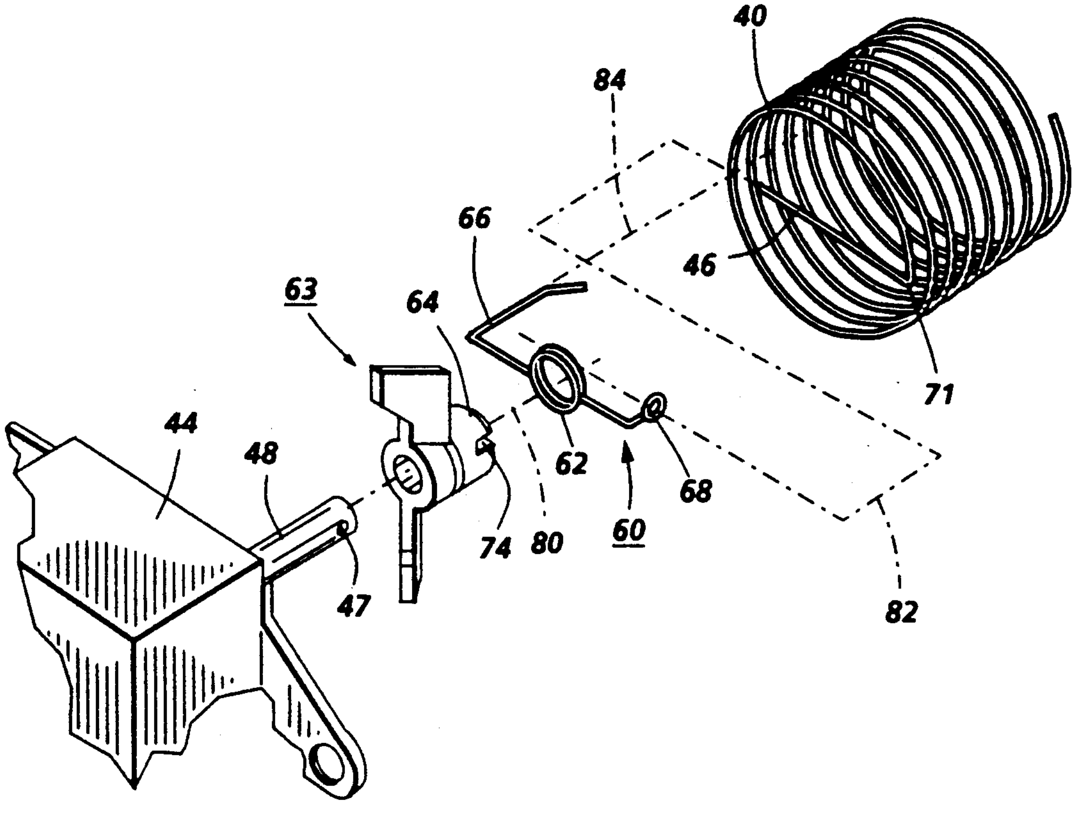
FIG. 2 is an exploded perspective view illustrating the members of a slinky auger drive coupling and anti-bridging device of the present invention.

The developer storage and dispensing apparatus of the present invention will be described with further reference to FIGS. 1 through 3. Developer dispensing apparatus 20 includes a generally rectangular elongated container 28 (FIGS. 1 and 3) enclosed at both ends by end plates 30 and 32. At the bottom of the rectangular container is a dispensing opening 34 (FIG. 1). Developer including toner and carrier particles is dispensed from the dispensing opening 34 located in one end of the container 28, the developer falling by gravity into auger assembly 36 (FIG. 3) which delivers the developer to the developer sump associated with the developer roll 19.

The developer is moved towards opening 34 by means of a helical spring or slinky auger system 40 which extends along the length of the container 28 between end plates 30, 32 and which is adapted to transport developer material 42 towards the opening 34. In a typical construction the diameter of the auger is about 39 mm with a pitch of about 5.5 mm, pitch being defined as a distance between adjacent springs in the coil. Spring auger 40 is drivingly attached to motor (not shown) disposed in a drive housing 44 by an attachment member 46 (FIG. 2) which is inserted through a hole 47 in a gear shaft 48. Shaft 48 is rotated slowly by the motor via a worm and worm gear assembly, also disposed in the drive housing 44. Fixedly attached to end plate 32 is a hold down mechanism 54 shown in FIG. 1. The holddown mechanism has a depending segment 56 extending downwardly from the rear wall at an angle. The end of spring auger 40 has several coils 40A which loosely encircle holddown mechanism 54.

In operation, spring auger 40 is rotated by motor via the shaft 48 in the dispensing direction so that developer is moved towards dispensing opening 34. Depending upon the composition of the developer bed and particularly when the developer bed comprises a mixture of toner and carrier, the "free" end of the auger has a tendency to move vertically upward through the developer mixture. If this upward movement is not corrected the auger would rise to the top of the developer bed greatly reducing the efficiency of the transport. However, referring to FIG. 1 if the auger begins an upward excursion, coils 40A encounter the beveled surface 56 of holddown shoe 54. The auger continues to rotate but is now prevented from rising any further vertically through the developer bed. The auger's rotation is slightly affected by the mechanical interference with surface 56 but in a beneficial fashion. As the auger rotates, the auger end begins to wind up to a fraction of a rotation depending upon the number of coils constrained by shoe 54. As the coils wind up energy is stored. At some point, (approximately ¼ rotation for the embodiment shown), the resistance to rotation is overcome, the coils "slip" back to their normal rotational position thereby releasing the stored energy as it uncoils. The release of this energy is transferred to the developer material surrounding the auger and, in effect, provides a thumping action which serves an anti-bridging function. The storage and release of energy provided by the interaction of spring auger 40 and hold down shoe 54 has a predictable frequency which is constant irrespective of the amount of developer through which the auger is rotating. The amplitude of the energy released at uncoiling is directly proportional to the number of coils that are encircling shoe 54.

While the holddown shoe 54 has the configuration shown, other configurations are possible consistent with the interaction principle described above. Edge 56 may be beveled at a different angles or have a semicircular configuration while still retaining the energy storing and anti-bridging function. The surface can also be perpendicular to the back wall in which case it would be useful only for the function of restraining the upward movement of the auger. The holddown shoe is intended to embrace all such alternatives and modifications as may fall within the scope and spirit of the appended claims.

The coils of the slinky auger 40 adjacent the opening 34 do not overly any portion of the opening as is the case in prior art devices. By so positioning the coils of the auger relative to the opening an increased exchange of developer material between the slinky auger and the opening is provided compared to the exchange when the coils of the auger overly all or a part of the opening.

A centering yoke 60 (FIGS. 1 and 2) comprising a wire form shaped to form one and a half circular turns at the center thereof as indicated by reference character 62. The turns delineate an opening for insertion of the tubular base 64 of an anti-bridging device 63. The tubular base, in turn, has an elongated opening for insertion of the shaft 48. One end of the centering yoke is bent at an angle of 90° to form a tine 66 while the opposite end is shaped to form a single circular turn as indicated at 68. Installation of the centering yoke is effected by insertion of the attachment leg 46 of the slinky auger through the opening 47 in the shaft 48 and a slot 74 in the end of the anti-bridging device 63. The walls defining the slot and the attachment leg cooperate to mechanically connect the centering yoke and the anti-bridging device so that the latter can be rotatingly driven by the former. Abutment of the bent portion 71 of the auger and the single coil portion 68 together with the abutment of the tine 66 with the inner surface of some of the coils of the auger serves to fixedly position the coils of the slinky auger relative to the shaft and the anti-bridging device so that the axis of rotation of the slinky auger remains in the center of the auger. The bent portion or tine 66 of the yoke abuts the inside of surfaces of several of the coils of the auger adjacent the free end of the attachment leg while the coiled portion of the yoke engages the opposite end 71 of the attachment. The dotted lines shown in FIG. 2 shows how the aforementioned components fit together. For example, the dotted line represented by reference character 80 indicates that after assembly of the auger 40, yoke 60 and anti-bridging device 63, the shaft 48 extends through the opening in the anti-bridging device 63 and the opening in the centering yoke 60. The dotted line indicated by the reference character shows that the connecting leg 46 passes through the single coil 68 and the hole 47 in the shaft 48. The dotted line 84 indicates that when assembled, the tine 66 engages the first few coins of the the auger 40.

A roof or wall 80 depending from a top wall 82 of the dispenser housing serves to preclude avalanching of developer from a developer supply contained in a developer bottle 84. Prevention of the avalanching effect insures uniform movement of the developer material by the slinky auger.

What is claimed is:

1. A developer dispensing apparatus including an elongated dispenser containing a quantity of developer material including toner and carrier beads, said apparatus comprising:

a coiled spring in said dispenser for transporting developer material between opposed walls of said dispenser, said dispenser having an opening in the bottom thereof adjacent one of said opposed walls, said opening providing communication between said dispenser and a developer housing supply;

means including a shaft, said shaft having a diameter which is small compared to the opening delineated by said spring;

said coiled spring having an elongated attachment leg for drivingly interconnecting said shaft and said transport means, said attachment leg extending across said opening; and means for maintaining the position of said attachment leg fixed relative to the axis of rotation of said shaft whereby relative displacement therebetween is minimized to prevent the coiled spring from bowing and for maintaining uniform rotation of the coiled spring about the axis of the shaft.

2. Apparatus according to claim 1 wherein said maintaining means comprises a centering yoke having a center portion encircling said shaft and end portions engaging portions of said spring.

3. Apparatus according to claim 2 wherein said shaft has a hole therethrough for insertion of said attachment leg.

4. Apparatus according to claim 3 including an anti-bridging member supported by said shaft and encircled by said center portion of said centering yoke.

5. Apparatus according to claim 4 wherein said anti-bridging device comprises a slot for receiving said attachment leg when said leg is inserted into said hole.

6. Apparatus according to claim 5 wherein said coiled spring is positioned in said dispenser such that none of the coils thereof overlies said opening.

7. Apparatus according to claim 6 including means for controlling the flow of developer from said developer housing supply into said dispenser whereby said transport means uniformly moves developer into said opening.

* * * * *